United States Patent
Kim et al.

(10) Patent No.: US 11,019,385 B2
(45) Date of Patent: May 25, 2021

(54) CONTENT SELECTION FOR NETWORKED MEDIA DEVICES

(71) Applicant: Samsung Electronics Co., Ltd., Suwon-si (KR)

(72) Inventors: Hyun-Woo Kim, Mountain View, CA (US); Pirooz Chubak, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/364,567

(22) Filed: Nov. 30, 2016

(65) Prior Publication Data

US 2017/0208353 A1 Jul. 20, 2017

Related U.S. Application Data

(60) Provisional application No. 62/281,081, filed on Jan. 20, 2016.

(51) Int. Cl.
*H04N 21/2668* (2011.01)
*H04N 21/8352* (2011.01)
(Continued)

(52) U.S. Cl.
CPC ..... *H04N 21/2668* (2013.01); *G06Q 30/0267* (2013.01); *H04L 43/16* (2013.01);
(Continued)

(58) Field of Classification Search
CPC .................................................. H04N 21/2747
(Continued)

(56) References Cited

U.S. PATENT DOCUMENTS 6,718,551 B1 * 4/2004 Swix ..................... G06Q 30/02
348/E7.075
8,046,797 B2 * 10/2011 Bentolila ........... G06Q 30/0251
705/14.49
(Continued)

FOREIGN PATENT DOCUMENTS

CN 104823451 A 8/2015
EP 1207696 A1 5/2002

OTHER PUBLICATIONS

International Search Report and Written Opinion dated Apr. 3, 2017 for International Application No. PCT/KR2017/000588 from Korean Intellectual Property Office, pp. 1-9, Daejeon, Republic of Korea.
(Continued)

*Primary Examiner* — Mushfikh I Alam
(74) *Attorney, Agent, or Firm* — Sherman IP LLP; Kenneth L. Sherman; Steven Laut (57) ABSTRACT

A server for providing selected content to networked display devices is presented. The server includes a memory configured to store instructions. At least one processor is configured to execute the instructions to: receive television programming data and automatic content recognition data from a networked display device, and selectively link the networked display device to a viewing group based on the television programming data and automatic content recognition data. An advertisement engine is configured to provide an advertisement to the networked display device. The advertisement is selected based on the viewing group linked to the networked display device.

20 Claims, 7 Drawing Sheets

(51) Int. Cl.
*G06Q 30/02* (2012.01)
*H04L 12/26* (2006.01)
*H04L 29/08* (2006.01)
*H04N 21/234* (2011.01)
*H04N 21/25* (2011.01)
*H04N 21/258* (2011.01)
*H04N 21/2665* (2011.01)
*H04N 21/426* (2011.01)
*H04N 21/61* (2011.01)
*H04N 21/81* (2011.01)
*H04N 21/218* (2011.01)
*H04N 21/233* (2011.01)

(52) U.S. Cl.
CPC ..... *H04L 67/327* (2013.01); *H04N 21/23418* (2013.01); *H04N 21/252* (2013.01); *H04N 21/25891* (2013.01); *H04N 21/2665* (2013.01); *H04N 21/4263* (2013.01); *H04N 21/6125* (2013.01); *H04N 21/6175* (2013.01); *H04N 21/812* (2013.01); *H04N 21/8352* (2013.01); *H04N 21/218* (2013.01); *H04N 21/233* (2013.01)

(58) Field of Classification Search
USPC .................................................. 725/74–104
See application file for complete search history.

(56) References Cited

U.S. PATENT DOCUMENTS

| | | | |
|---|---|---|---|
| 8,490,124 B2 * | 7/2013 | Michael | H04N 21/431 725/14 |
| 8,640,162 B2 | 1/2014 | Chen et al. | |
| 8,695,032 B2 | 4/2014 | Shkedi | |
| 8,707,363 B2 * | 4/2014 | Phillips | H04N 21/44204 725/46 |
| 8,869,194 B2 | 10/2014 | Yu et al. | |
| 8,925,001 B2 | 12/2014 | Morris et al. | |
| 8,997,138 B2 | 3/2015 | Shkedi | |
| 9,015,748 B2 | 4/2015 | Pharn | |
| 9,148,680 B1 | 9/2015 | Fulton et al. | |
| 9,226,019 B2 | 12/2015 | Shkedi | |
| 9,241,188 B2 * | 1/2016 | Mukerji | G06Q 20/10 |
| 9,241,200 B2 | 1/2016 | Chen | |
| 10,547,896 B2 * | 1/2020 | Kambhatla | H04N 21/4516 |
| 2002/0123928 A1 | 9/2002 | Eldering et al. | |
| 2002/0178447 A1 | 11/2002 | Plotnick et al. | |
| 2003/0093792 A1 | 5/2003 | Labeeb et al. | |
| 2006/0153296 A1 * | 7/2006 | Deng | G06K 9/00711 375/240.12 |
| 2007/0283403 A1 * | 12/2007 | Eklund, II | G09B 5/06 725/117 |
| 2008/0155602 A1 * | 6/2008 | Collet | H04N 21/235 725/46 |
| 2008/0263583 A1 | 10/2008 | Heath | |
| 2008/0276270 A1 | 11/2008 | Kotaru et al. | |
| 2009/0100459 A1 * | 4/2009 | Riedl | H04N 21/2385 725/35 |
| 2009/0172728 A1 | 7/2009 | Shkedi et al. | |
| 2009/0183220 A1 * | 7/2009 | Amento | H04N 21/252 725/120 |
| 2009/0271826 A1 * | 10/2009 | Lee | H04N 5/44543 725/46 |
| 2009/0288113 A1 * | 11/2009 | Skinner | G06Q 30/02 725/32 |
| 2011/0078717 A1 * | 3/2011 | Drummond | H04N 21/4586 725/14 |
| 2011/0099197 A1 * | 4/2011 | Wang | H04H 60/40 707/769 |
| 2011/0126258 A1 * | 5/2011 | Emerson | H04L 51/04 725/133 |
| 2011/0239253 A1 * | 9/2011 | West | H04N 21/234363 725/46 |
| 2011/0307913 A1 * | 12/2011 | Wang | G06Q 10/063 725/9 |
| 2012/0233644 A1 * | 9/2012 | Rao | H04M 1/7253 725/62 |
| 2012/0266189 A1 | 10/2012 | Zaslavsky et al. | |
| 2013/0036438 A1 * | 2/2013 | Kutaragi | H04N 21/2743 725/38 |
| 2013/0055323 A1 * | 2/2013 | Venkitaraman | H04N 21/4126 725/82 |
| 2013/0254787 A1 * | 9/2013 | Cox | G06Q 30/02 725/13 |
| 2014/0026156 A1 * | 1/2014 | Deephanphongs | G06Q 30/0201 725/12 |
| 2014/0033243 A1 * | 1/2014 | Chen | H04N 21/2668 725/23 |
| 2014/0045472 A1 * | 2/2014 | Sharma | H04W 4/08 455/416 |
| 2014/0109123 A1 * | 4/2014 | Balakrishnan | H04N 21/44222 725/14 |
| 2014/0173651 A1 * | 6/2014 | Mathews | H04N 21/812 725/34 |
| 2014/0259040 A1 * | 9/2014 | Han | H04N 21/25875 725/14 |
| 2014/0281004 A1 * | 9/2014 | Bridges | H04N 21/4622 709/231 |
| 2014/0282747 A1 * | 9/2014 | Richman | H04N 21/2146 725/62 |
| 2014/0302773 A1 * | 10/2014 | Jantunen | H04N 21/42203 455/3.01 |
| 2014/0325361 A1 * | 10/2014 | Lee | H04M 1/72533 715/730 |
| 2014/0337883 A1 * | 11/2014 | Foote | H04N 21/44222 725/34 |
| 2014/0351835 A1 * | 11/2014 | Orlowski | H04N 21/4383 725/9 |
| 2014/0373038 A1 * | 12/2014 | Tsuji | H04N 21/44008 725/14 |
| 2015/0025965 A1 | 1/2015 | Yu et al. | |
| 2015/0026719 A1 * | 1/2015 | Menon | H04N 21/2668 725/34 |
| 2015/0058884 A1 | 2/2015 | Eldering et al. | |
| 2015/0135244 A1 * | 5/2015 | Hilson | H04N 21/2353 725/93 |
| 2015/0172757 A1 * | 6/2015 | Kafle | H04L 67/1044 725/81 |
| 2015/0181268 A1 * | 6/2015 | Navin | H04N 21/2668 725/18 |
| 2015/0213493 A1 | 7/2015 | Debois et al. | |
| 2015/0237409 A1 * | 8/2015 | Harper | H04N 21/6543 725/19 |
| 2015/0319469 A1 * | 11/2015 | Nahata | H04N 21/44222 725/28 |
| 2016/0037204 A1 * | 2/2016 | McSweeney | H04N 21/4263 725/39 |
| 2016/0073176 A1 * | 3/2016 | Phillips | H04N 21/2402 725/35 |
| 2016/0150257 A1 * | 5/2016 | Sokolov | H04N 21/25435 725/8 |
| 2016/0205443 A1 * | 7/2016 | Ghadi | H04N 21/812 725/34 |
| 2017/0032394 A1 * | 2/2017 | Stevens | G06Q 30/0203 |
| 2017/0034592 A1 * | 2/2017 | Ray | G06Q 30/0251 |
| 2017/0126781 A1 * | 5/2017 | Zhou | H04L 67/32 |
| 2017/0214975 A1 * | 7/2017 | Schmidt | H04N 21/482 |
| 2018/0288219 A1 * | 10/2018 | Chao | H04H 60/33 |

OTHER PUBLICATIONS

Extended European Search Report dated Dec. 12, 2018 for European Application No. 17741639.3 from European Patent Office, pp. 1-9, Munich, Germany.

Chinese Office Action dated Mar. 3, 2020 for Chinese Patent Application No. 201780007384.1 from Chinese Patent Office, pp.

(56) References Cited

OTHER PUBLICATIONS 1-17, Beijing, China (English-language translation included pp. 1-8).

European Office Action dated Apr. 14, 2020 for European Patent Application No. 17741639.3 from European Patent Office, pp. 1-7, Munich, Germany.

Chinese Office Action dated Nov. 4, 2020 for Chinese Patent Application No. 201780007384.1 from China Patent Office, pp. 1-16, Beijing, China (English-language translation included pp. 1-13).

European Summons to attend oral proceedings pursuant to Rule 115(1) EPC dated Jan. 28, 2021 for European Patent Application No. 17741639.3 from European Patent Office, pp. 1-8, Munich, Germany.

* cited by examiner

CONTENT SELECTION FOR NETWORKED MEDIA DEVICES

CROSS-REFERENCE TO RELATED APPLICATIONS

This application claims the priority benefit of U.S. Provisional Patent Application Ser. No. 62/281,081, filed Jan. 20, 2016, which is incorporated herein by reference in its entirety.

TECHNICAL FIELD

One or more embodiments relate generally to content selection and delivery, and in particular, to improving content selection and delivery using program information and assignment of one or more taste buckets (groups) to networked devices.

BACKGROUND

Network-connected (e.g., Internet) televisions (TVs) are of increasing interest. With network-connected TVs, additional content is accessible from network sources and may be displayed on the network-connected TVs.

SUMMARY

One or more embodiments relate to content selection based on program information and assignment of one or more taste buckets (groups) to networked devices. In some embodiments, a server for providing selected content to networked display devices includes a memory configured to store instructions. At least one processor is configured to execute the instructions to: receive television programming data and automatic content recognition data from a networked display device, and selectively link the networked display device to a viewing group based on the television programming data and automatic content recognition data. An advertisement engine is configured to provide an advertisement to the networked display device. The advertisement is selected based on the viewing group linked to the networked display device.

In some embodiments, a method for providing selected content to networked display devices comprises receiving television programming data and automatic content recognition data from a networked display device. The method further includes selectively linking the networked display device to a viewing group based on the television programming data and automatic content recognition data. The method additionally includes providing an advertisement to the networked display device. The advertisement selected based on the viewing group linked to the networked display device.

In some embodiments, a non-transitory processor-readable medium that includes a program that when executed by a processor performs a method. The method comprises receiving, by a processor, television programming data and automatic content recognition data from a networked display device. The method further includes selectively linking the networked display device to a viewing group based on the television programming data and automatic content recognition data. The method additionally includes providing an advertisement to the networked display device. The advertisement selected based on the viewing group linked to the networked display device.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for providing selected content to networked display devices. In some embodiments, a server includes a memory configured to store instructions. At least one processor is configured to execute the instructions to: receive television programming data and automatic content recognition data from a networked display device, and selectively link the networked display device to a viewing group based on the television programming data and automatic content recognition data. An advertisement engine is configured to provide an advertisement to the networked display device. The advertisement is selected based on the viewing group linked to the networked display device.

One or more embodiments may include an advertisement platform that interfaces with a device profiles data server and with a networked device (e.g., a TV or smart TV device, a desktop computer, a laptop computer, a mobile device (e.g., a smartphone or a tablet computer), a wearable computer device, a media player (e.g., a DVD player, an interface device that streams content from a device to another device, etc.). The advertisement platform may include data representing advertising campaigns that target one or more taste buckets (groups) (e.g., categories or genres of content, such as sports, comedy, drama, reality, talk shows, news, animation, education, food, documentary, music, fashion, travel, business and finance, etc.). When a networked device requests an advertisement, the advertisement platform associates a device identifier with the networked device to its profile data to determine advertising campaigns associated with the taste bucket(s) (group(s)) of the networked device. Advertisement data (e.g., the campaign ID) is transmitted to the networked device to display the advertisement on the networked device.

One or more embodiments enable effective delivery of personalized advertisements possibly maximizing click through rates (CTRs) and user satisfaction of new advertising viewing experience. Real-time counting of networked devices having a set of given taste buckets (groups) provides potential advertisers invaluable information about the degree of reach. Further, networked device advertisers are provided with the power to target networked device users with specific interest.

Figure 1:
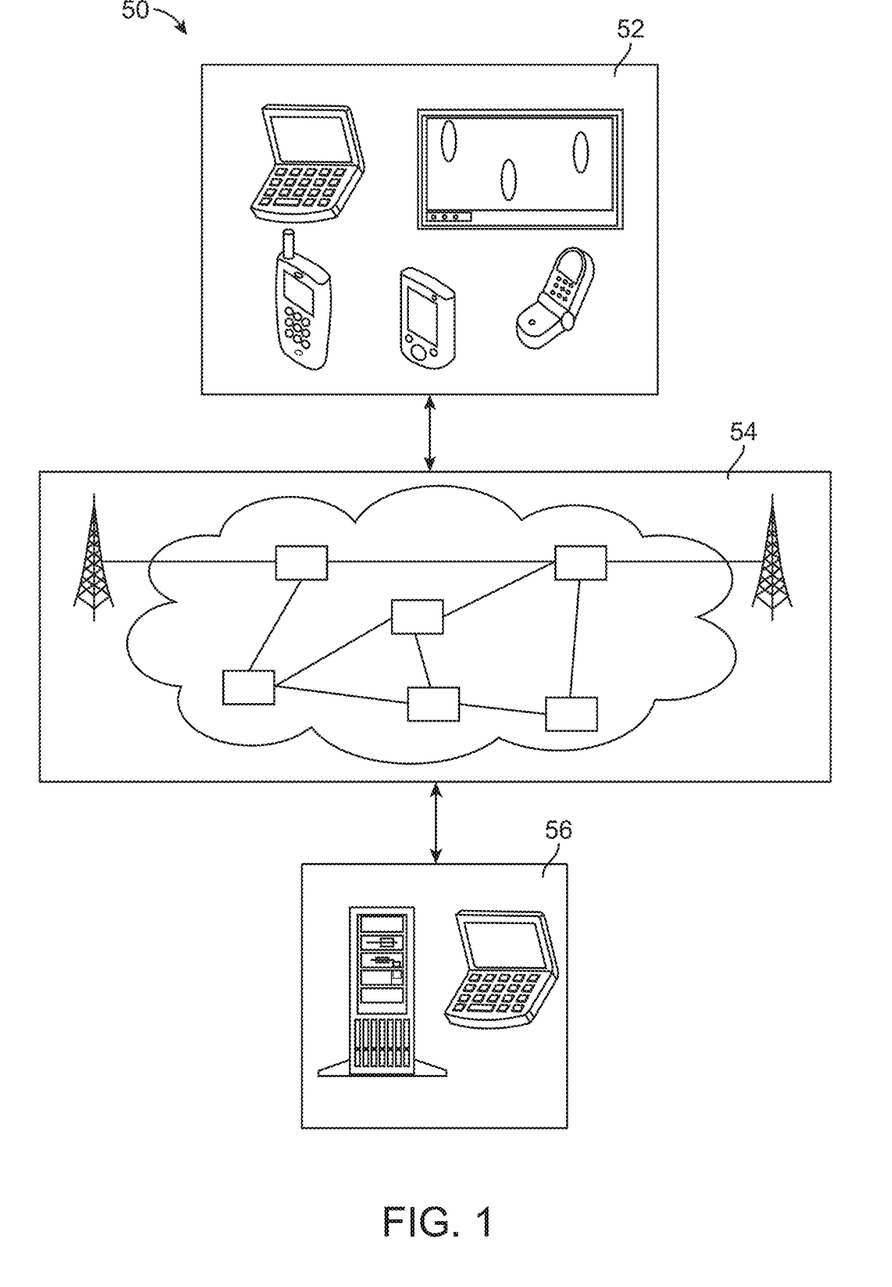
FIG. 1 shows an electronic system for selective content provisioning, according to some embodiments.

FIG. 1 shows an electronic system 50 that may be employed with one or more embodiments. The electronic system 50 includes a first device 52, such as a client or a server, connected to a second device 56, such as a client or server. The first device 52 may communicate with the second device 56 with a communication path 54, such as a wireless or wired network.

In some examples, the first device 52 may be of any of a variety of networked devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a ultra-high definition TV (UHDTV), or any other type of UD display device (e.g., monitor, video panel, heads up display (HUD), smart telephone, tablet device, video device, gaming device, etc.).

The second device 56 may be any of a variety of centralized or decentralized computing devices, image or video transmission devices. For example, the second device 56 may be a smart TV, a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

One or more embodiments may selectively link each of multiple of media devices to each of multiple taste buckets (groups) or content-genre groups based on a ranking criterion determined using aggregated automatic content recognition (ACR) data for the respective networked (media) devices and electronic program guide (EPG) data. In some embodiments, a technique using a moving time window allows capture of long-term user behavioral patterns while avoiding ingestion of unnecessarily old data. This technique is proven to be computationally efficient and leads to processing savings when executing with an elastic cloud computing infrastructure. On-line real time counting of networked devices linked to a specific taste bucket (group) is provided, where each taste bucket (group) may have different parameters used to find networked devices that should be linked to a specific taste bucket (group), thus fine-grained tuning is possible for one or more embodiments.

Figure 2:
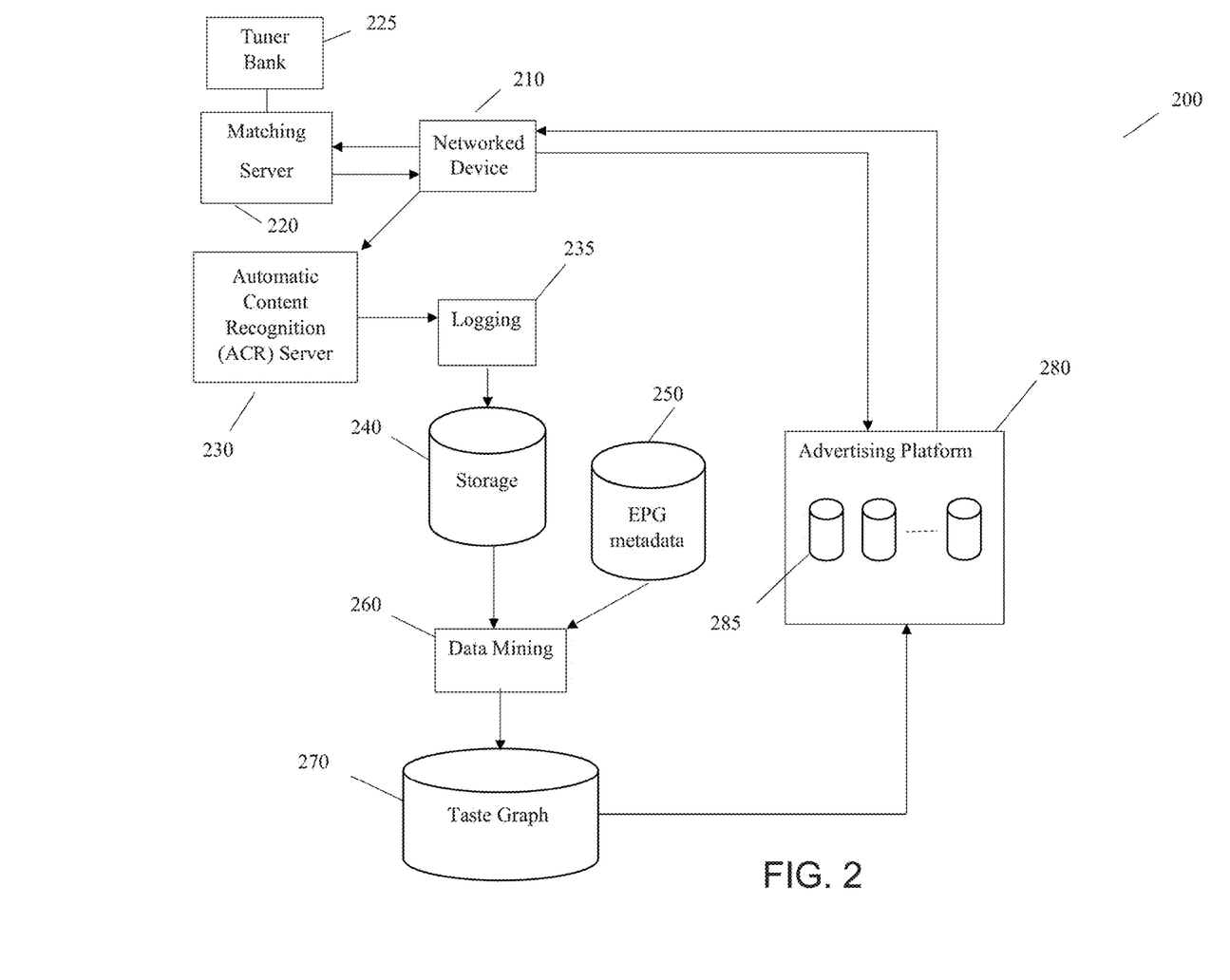
FIG. 2 shows an example system for selective content provisioning, according to some embodiments.

FIG. 2 shows an example system 200 for selective content (e.g., advertising content) provisioning, according to some embodiments. In some embodiments, the system 200 includes a networked (display) device 210 (e.g., a television device, a desktop computer, a laptop computer, a mobile device (e.g., a smartphone or a tablet computer), a wearable computer device, a media player (e.g., a DVD player, an interface device that streams content from a device to another device), etc.), a matching server 220, a tuner bank 225, an ACR server 230, logging (device or process) 235, storage 240 (e.g., a data storage device, a database, etc.), EPG server (and metadata storage) 250 (a server connected with a data storage device, a database, etc.), data mining (device or process) 260, taste graph (a data storage device, a data structure, database, etc.) 270, and an advertising platform or engine 280 with one or more advertising campaigns 285. In some embodiments, the example system 200 shows architecture of an advertising server system. In some embodiments, one or more devices (e.g., networked device 210), severs (e.g., matching server 220, ACR server 230, etc.), and/or other components (e.g., databases such as storage 240) of the system 200 are combined into (and any one or combination of the functionalities/operations of such are performed by) a single device, server, or component (e.g., functionalities of matching server 220 and ACR server 230 are performed by a single server device, not shown).

Furthermore, in some cases, some of the devices, servers, and/or other components of the system 200 (and the data stored therein) are associated with the same or distinct vendors.

The system 200 generates (program channel) taste graph data for a number of networked devices 210 based on ACR and EPG data. In one example, a taste graph is a number of taste buckets (groups), each taste bucket (group) being linked to a number of networked devices 210 (e.g., via device identifiers). The taste graph may then be used to select and target advertisements. In some embodiments, the tuner bank 225 includes multiple tuner banks. A tuner bank refers to a facility that captures fingerprints of linear programs on a set of television channels receivable through television signal antennae, both analog and digital; the Internet; the Digital Multimedia Broadcasting (DMB) receivers; satellite signal receivers; and cable subscription services. A different tuner bank may receive a different quality of TV contents in terms of screen resolution. Also a different tuner bank may cover a different set of television channels. A tuner bank may add and remove channels at any time of its operation.

In some embodiments, the networked device 210 transmits fingerprint data to the matching server 220. In one example, fingerprint data may include a snapshot of a video or television show being displayed and may also include a portion of audio data being played. The matching server 220 provides match data to the networked device 210, which may include the channel, program, and timestamp. In turn, the networked device 210 transmits to the ACR server 230 the match data and device metadata, such as the device identifier of the networked device 210. The logging (device or process) 235 is connected with the ACR server 230 and stores the match and device metadata in the storage 240. The logging (device or process) 235 may log data (e.g., match and device metadata) for a number of networked devices 210 to aggregate the data. The system 200 may include any number of networked devices 210 providing match and device metadata in this way.

In some embodiments, the data mining 260 interfaces with the storage 240 and the EPG server 250 that provides EPG metadata (e.g., provided by a ROVI® server). The EPG metadata may include genre information as well as other information such as program titles, actors, description, etc. The data mining (device or process) 260 analyzes the logged data from the logging (device or process) 235 and the EPG metadata to determine which taste bucket (group) that the watched program belongs to. By processing the logged data and the EPG data, the data mining (device or process) 260 generates and updates profiles for each networked device 210 of the system 200. That is, each networked device 210 has a device identifier that is associated with one or more profiles. One of the profiles is the taste graph profile, which indicates which taste buckets (groups) that the networked device 210 of the device identifier belongs to. Additionally, or alternatively, the system 200 may maintain the taste graph 270 (data storage device, a data structure, database, etc.) that stores each device identifier for each taste bucket (group).

In some embodiments the EPG server 250 may be implemented as a server (or database) that stores metadata for video games (e.g., video game title, genre, console, etc.), and the ACR is configured to identify video games played by a particular networked device (e.g., using fingerprints), for how long the video games are played, etc. These inputs may be fed into taste graph model 320 (FIG. 3) to determine corresponding taste groups. In some embodiments where the ACR system detects a particular video game by capturing fingerprints of video being played as part of a game (e.g., intro video showing a game name, etc.), a video game fingerprint bank for matching purposes is implemented. In one or more embodiments, a networked media device such as a TV, sends a fingerprint to the video game fingerprint bank, and the fingerprint bank returns information on the game matched. In some embodiments, a guide similar to an EPG is implemented for video games, which contains game metadata of games such as game title, game genre/type, age rating, etc. The video game fingerprint bank, and the video game metadata are added to support taste graphs for video games. In some embodiments, the taste graph for video games generates user segments/buckets based on preferred game genres/types. In some embodiments, the techniques described above for TV programming data and video games may be analogously applied to Video On Demand (VOD) content (e.g., server that stores metadata for VOD content, ACR configured to identify VOD content played by a particular network device, inputs are fed into taste graph model to determine corresponding taste groups, use of a VOD fingerprint bank, etc.).

Figure 3:
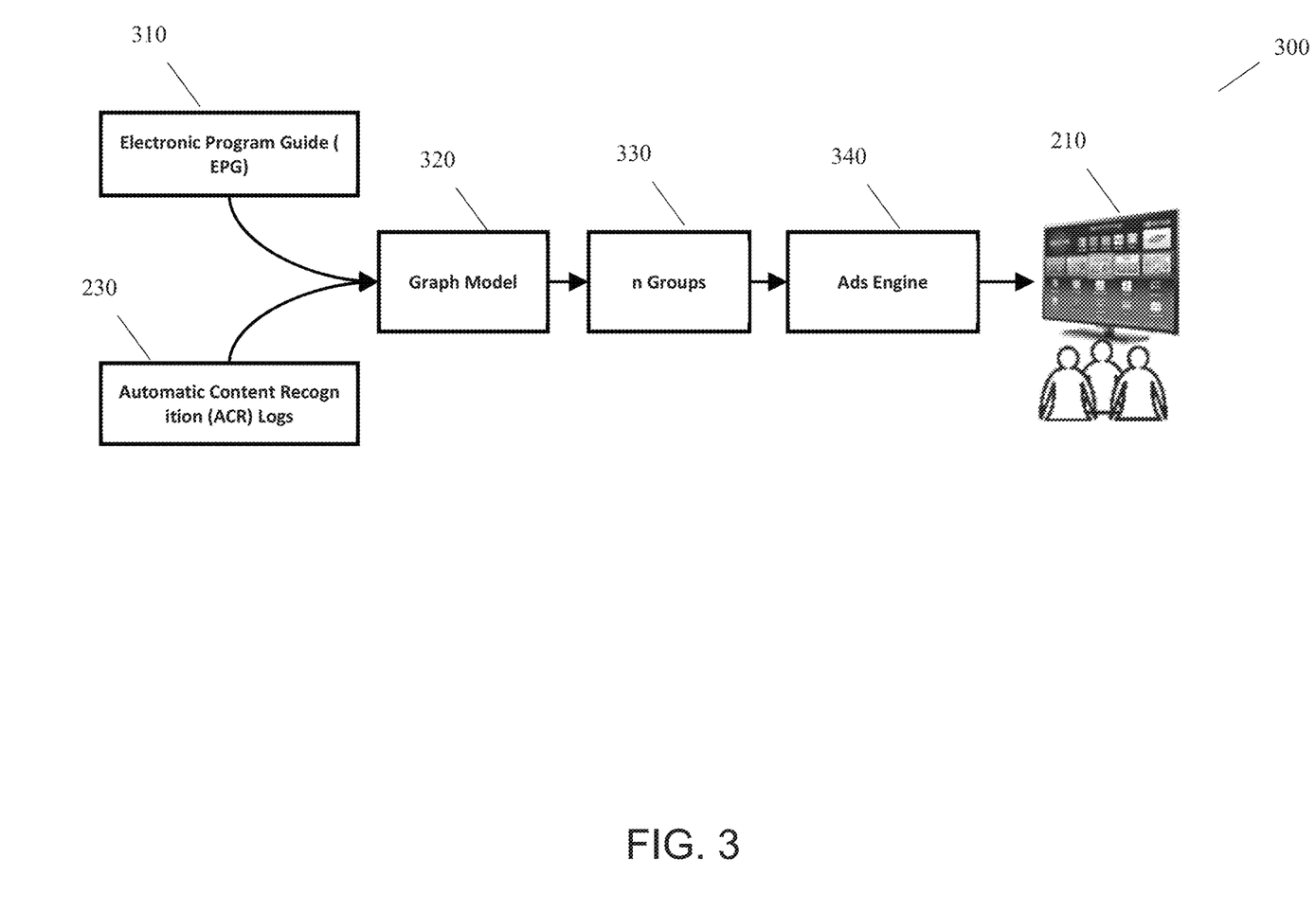
FIG. 3 shows a flowchart for a selective content provisioning system, according to an embodiment.

FIG. 3 shows a flowchart 300 for a selective content provisioning system, according to some embodiments. The flowchart 300 shows the flow for a taste graph system (e.g., system 200) that may include a taste graph model 320, an ads (advertisements) engine 340, and a target networked device 210. The taste graph model 320 and the ads engine 340 may be hosted in a server (e.g., the advertising platform 280 (FIG. 2) connected to the target networked device 210 via a network such as the Internet), deployed on a device connected to the target networked device 210, or may be deployed on the target networked device 210. The target networked device 210 may have one or more users.

In some embodiments, during operation, the taste graph system may receive an EPG 310 and ACR log 230 data as input. The EPG 310 contains metadata of TV/cable/satellite programs in the past and to be aired in the future. The metadata includes, for each show, one or more of the following: program title, program genre(s), channel names, air time, description, etc. The EPG 310 is not linked to networked devices 210. Rather, the EPG 310 is a source of information for TV programs. ROVI® is an example of a service that provides an EPG. ACR log data 230 is linked to the corresponding target networked device 210. In some examples, ACR technology informs what networked devices watched what TV programs on what channel, and for how long. This input data is fed into the initial taste graph model 320 to determine n (taste) groups 330 as output. As stated previously, n may be zero, one, ten, twenty, etc. number of groups. The n (taste) groups 330 that were determined by the graph model 320 are fed into the ads engine 340 as input. Based on the information about the n groups 340, the ads engine 340 provides targeted advertisements to the target networked device 210 as further described below.

In some embodiments, a generated taste graph intends to capture users' static and consistent behavioral patterns that have formed over a period of time (e.g., 28 weeks of time, 42 weeks of time, etc.). Therefore, in contrast to behavioral patterns tracked over a shorter duration of time, a taste graph may be less prone to seasonal biases caused by seasonally dominant programs. In other words, those seasonal biases need to be discounted so that true user tastes can be identified even when the vast majority of people watch the same dominant TV program momentarily. An example of a typical seasonal bias can be seen when Super Bowl games take place. Nielsen, an authority that measures television program ratings, reports that an average audience of 111.9 million were a Super Bowl game in February 2016. When such a seasonal bias is not discounted it is hard to find people among those 111.9 million who have long been a fan of other genres such as comedy, or of other sports such as baseball. There exists a number of people who would use most of their television watch time to watch other types of television programs when the Super Bowl season is over.

Determining whether a given user has a specific taste is based on the following. First, a high-level description of the taste graph processing or model is presented followed by additional details. For formulating each networked device 210 relevance to a given taste, a variable $R_{i,j}$ is introduced, which expresses the given networked device j's (e.g., networked device 210) ratio of total view time spent on programs, in the given time period (e.g., 28 weeks), that are determined to be related to each taste bucket (group) $T_i$. It should be noted that the length of the time window may change as necessary. In one example, a 28-week length is based on a given required computational power and the time it takes to process weekly updates. When considering resizing of the time window it should be noted that a longer time period can require more computational resources, and a shorter time window may not be able to overcome temporal biases and thus would be unable to capture stable patterns.

For one or more embodiments, the following describes how a networked device 210 is assigned to zero or more taste buckets (groups). Let W be the size of the time window in number of weeks. In one example, the time window W is set to 28 (slightly more than 6 months of time). Let $T_1$, $T_2$, ... $T_N$ be taste buckets (groups) where N is the total number of taste buckets (groups), which for example is 19. In one example, $T_1$ corresponds to Taste #1 (Sports—Football) and contains all device identifiers that belong to the football group. A device identifier, for example, may be a 32-digit ID that can be used to identify a networked device 210. Let $P_1$, $P_2$, ... $P_N$ be TV program groups, where $P_i$ is a list of the TV programs aired in the past W weeks that are related to the characteristics of $T_i$. To determine what should be included in $P_i$, in some embodiments the following information used includes: 1) the genre of each program, 2) the title of each program, 3) the genre of the channel that the program was aired on, and 4) the title of the channel that the program was aired on. In one example, these attributes of a program are provided by ROVI® Corporation in the form of an EPG database. Note that a taste bucket (group) may often have a 1-to-N relationship with genre information tagged by the attribute provider. For example, an attribute provider may have a comedy program associated with a genre name "comedy" or "comedia" or both. In the same manner, a drama may have "drama," "adaptation," "thriller," or "spin-off." Some taste buckets (groups) combine two different genres. For example, Animation may consist of "animation" and "cartoon" genres. Business/Finance may consist of "business" and "finance" genres. In other words, the taste groups are a higher-degree abstraction of the nature of TV programs.

In some embodiments, let U be the U.S. device profile database, and $U_j$ be a device identifier retrieved from the database. In some cases, the U.S. device profile database further describes networked devices 210 by device identifier. The U.S. device profile database is a database that may further describe particular networked devices 210, for example, Samsung Smart TVs, by device identifier. The database can be viewed as a universe of particular networked devices 210. Every networked device 210 is evaluated using device identifiers from the device profile database by matching those IDs to those in ACR logs 230. Additional information stored by the U.S. device profile database may include:

TV Location (City, State, Country, Zip code) and Internet Service Provider (e.g. Comcast) based on Internet Protocol (IP) address assigned
Networked device (e.g., TV) model number
Firmware Version
Screen resolution
Panel Size
Main Language In one embodiment, for every $U_j$, the taste graph system determines the total watch time S in seconds in the current target time window. For every $P_i$, the taste graph system determines the ratio or relative time amount $R_{i,j}$ of the total watch time S spent on programs in $P_i$. In other words, the ratio $R_{i,j}$ is used to figure out for every individual device identifier what percent of the total watch time was spent. Note that the time amount is not an absolute metric. It is intended to be a relative time amount for the given individual networked device 210.

In some embodiments for every pair of $P_i$ and $U_j$, the relative time amount $R_{i,j}$ is available. The information from $R_{i,j}$ is used to find top $C_i$% (where different taste groups T may have different $C_i$ percentage as a threshold; e.g., $C_1$ is assigned for $T_1$, $C_2$ is assigned for $T_2$, etc.) networked devices 210 in terms of the relative time amount and assign them to the corresponding taste bucket (group). For example, for $P_1$ all networked devices 210 in U will be sorted by their $R_{1,j}$ values in descending order, and those networked devices in the top $C_i$% in terms of the relative time amount are assigned to $T_1$. It should be noted that a given networked device 210 may rank top $C_i$% multiple times in multiple taste buckets (groups) and hence belong to multiple taste buckets (groups). In one example, the relative time amounts compete with those of other networked devices 210, therefore, the majority of the networked devices 210 belong to less than five (5) taste buckets (groups). In contrast, conventional approaches, such as K-means clustering, do not allow an entity (such as a TV) to be allocated to multiple groups (i.e., only one taste for one TV). It should be noted that while the methods and examples are described with respect to TV programming data, they may also be applied analogously to other types of content and in other contexts, such as video games and VOD (as described above).

Figure 4:
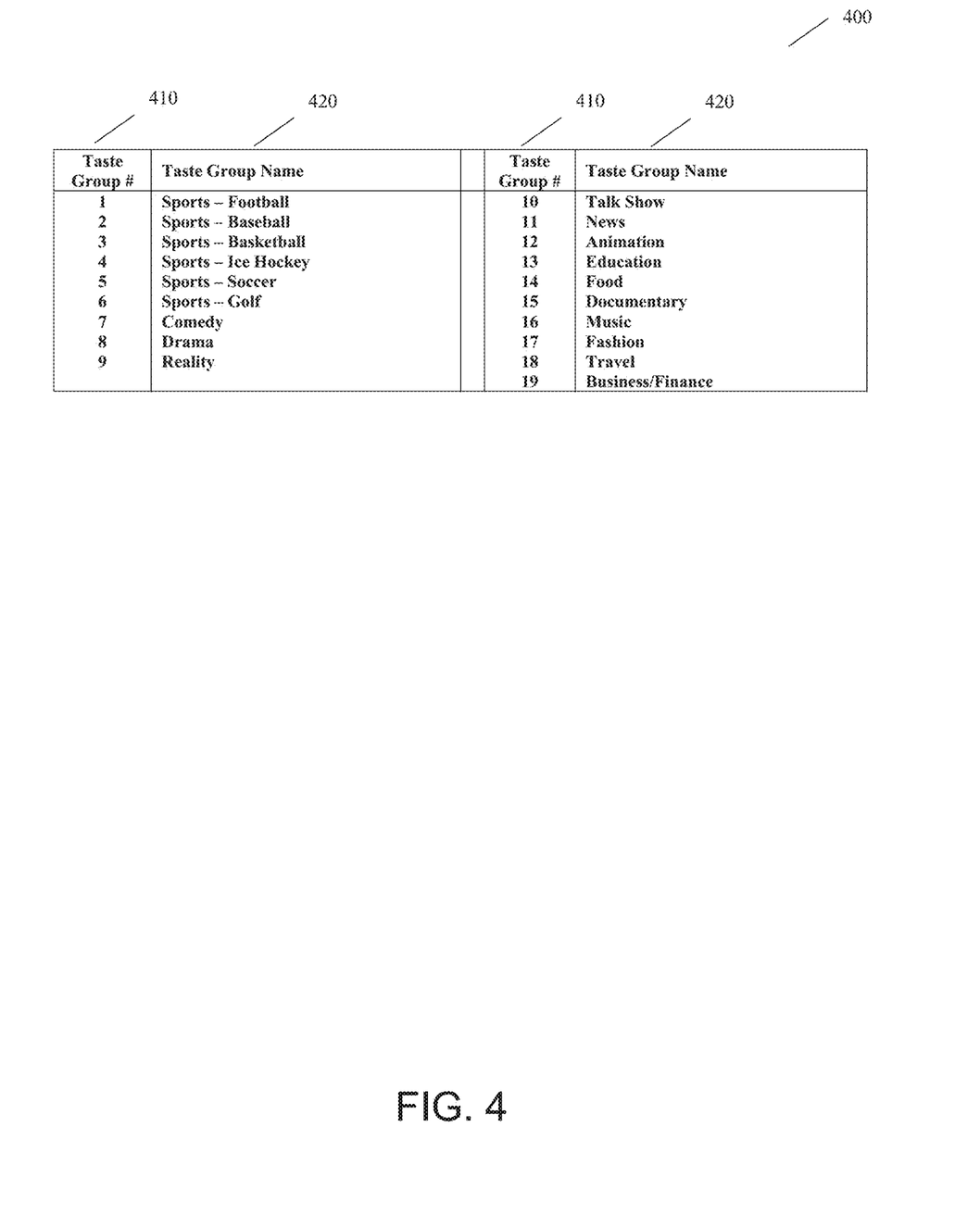
FIG. 4 shows an example of common topics, according to an embodiment.

FIG. 4 shows an example 400 of common topics, according to some embodiments. The common topics are listed by taste group (bucket) #410 and taste group (bucket) name 420. In some embodiments, a taste graph identifies n groups from nineteen (19) taste buckets (groups): 6 sport types (e.g., football, baseball, basketball, ice hockey, soccer and golf) and 13 non-sport popular interests (e.g., comedy, drama, reality, talk show, news, animation, education, food, documentary, music, fashion, travel and business/finance). This is distinguishable from a number of conventional approaches to unsupervised user clustering, which always only places a user into one bucket. A taste graph, however, links users (and/or associated networked devices) to zero or more taste buckets (groups). In one example, a user may often be placed into 1-3 taste buckets (groups). The tastes and number of tastes may be predetermined. For example, the nineteen (19) taste buckets (groups) of the example 400 were selected after an analysis of: (1) what are particular Smart TV users' popular genres of TV programs and channels according to the ACR logs 230 (FIGS. 2-3), and (2) what are TV programs/channels advertisers made most expenditure on in, for example, 2013. In some implementations, selection of the tastes buckets (groups) may be performed automatically (e.g., without human intervention) based on processing data indicative of ACR logs and advertisement expenditures.

Figure 5:
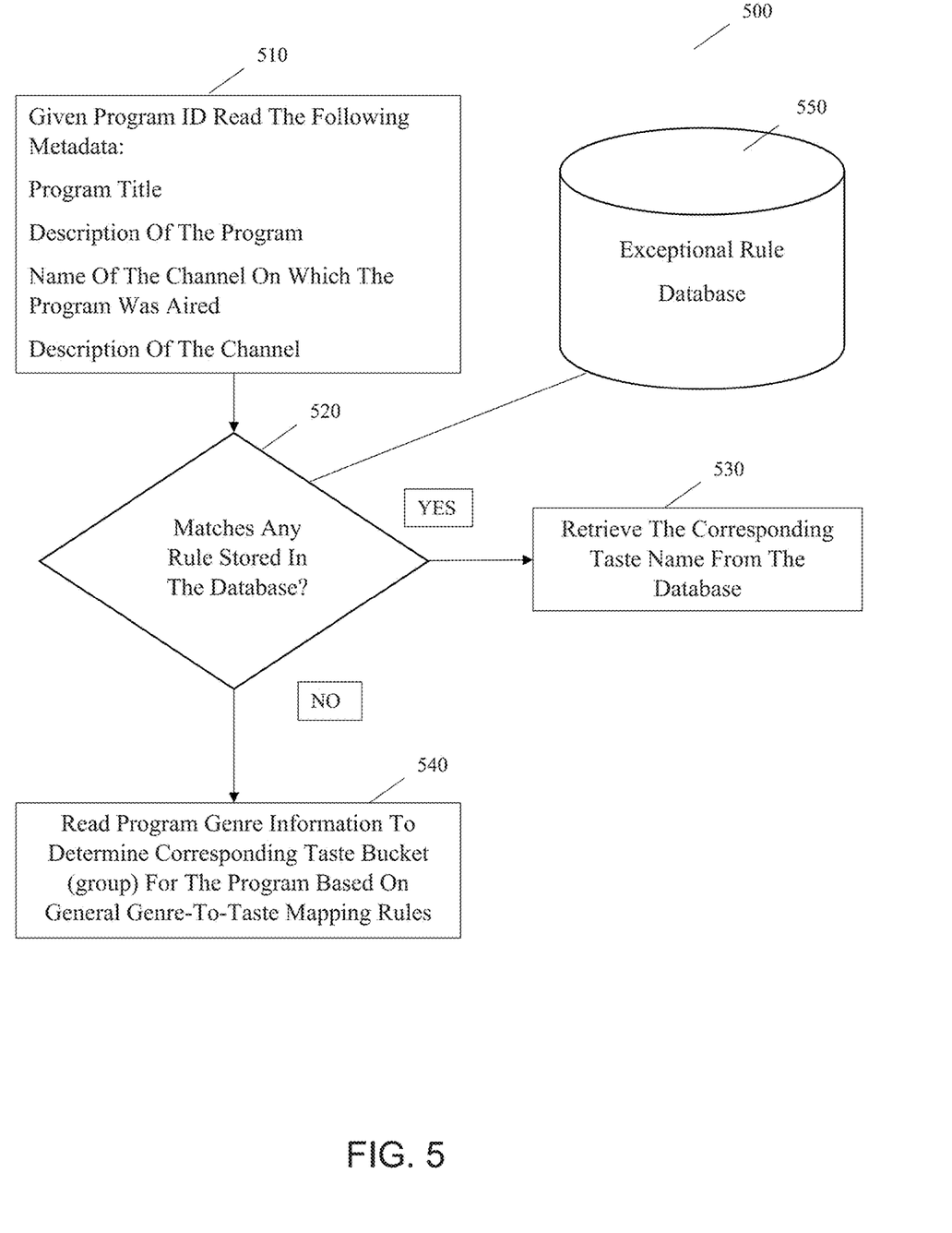
FIG. 5 shows an example flow diagram using title metadata of an electronic programming guide to refine genre metadata to select a taste bucket (group), according to an embodiment.

FIG. 5 shows an example flow diagram 500 using title metadata of an EPG to refine genre metadata for selection of a taste bucket (group), according to some embodiments. In some embodiments, EPG information including title metadata to refine genre metadata to select the taste bucket (group). This may be used to resolve ambiguity of the genre metadata and/or override genre metadata (e.g., Sport Center (genre metadata=sports) focused on Football can be categorized as football instead of the Sports based on the title. The problem herein is regarding imperfection of the program genre information. For some TV programs, genre information may be missing. In this case corresponding taste graph buckets (groups) may not be properly determined. To avoid this, other pieces of information, such as program title/description, channel name/description can be used to determine the right taste graph bucket (group) for the program based on defined rules stored in the form of a database (exceptional rule database 550).

In some embodiments, in block 510 given the program ID, metadata including program title, description of the program, name of the channel on which the program was aired and description of the channel is read. In block 520 it is determined whether the metadata information from block 510 matches any of the exceptional rules in the exceptional rule database 550. If there is a match, in block 530 the corresponding taste name is retrieved from the database (exceptional rule database 550). Otherwise, in block 540 program genre information is read to determine a corresponding taste bucket for the program based on general genre-to-taste mapping rules.

When using a conventional unsupervised clustering algorithm such as K-means, its update process would return disjoint clusters with cluster ID numbers such as Cluster 1, Cluster 2, etc., rather than meaningful names. Even worse, the cluster numbers can change when there is any change made to the data (e.g., new data points added, and/or existing data points dropped); Cluster 1 from yesterday's data is not necessarily the same as Cluster 1 from today's data. This means, in conventional technology a thorough manual examination of all identified clusters is necessary in order to assign meaningful names to all identified clusters (by looking into the characteristics of data points in each cluster) whenever new data is ingested. The taste graph processing described above does not require any manual labeling.

In some embodiments, similarly as described above, an image is captured from the networked (display) device (e.g., networked device 210, FIGS. 2-3), which is sent to be fingerprinted to determine the ACR data. A number of resolutions may be used for fingerprinting. In some embodiments, a selection of a resolution of the screenshot used for fingerprinting is made. A higher resolution screen shot may improve the accuracy of fingerprinting. Thus, taste graph data produced using high resolution screenshots may be more valuable than data produced using lower quality screen shots.

In some embodiments, a number of factors can be used to select the resolution of the screen shots. Factors that may be used for selecting the resolution of the screen shot may include the available resources of the networked device (e.g., networked device 210, FIGS. 2-3), network communication bandwidth, processing bandwidth, availability of tuner banks, selection of a tuner bank, requirements of tuner banks, etc.

In some embodiments, the system (e.g., system 200, FIG. 2) generates, in parallel, multiple versions of taste buckets (groups); one version for each of a plurality of resolutions of screenshots. In this way, the system may provide different services at different qualities. In some embodiments, there are multiple tuner banks. Tuner bank selection may be based on a number of factors, including the type of available data, such as the format of the screen shot, availability of an audio fingerprint, etc. For example, selection of the tuner bank or multiple tuner banks may be determined based on a bidding mechanism. A different tuner bank may have a different set of channels. Also a different tuner bank may use a different screen resolution (e.g. low, standard, HD, UHD, SUHD, etc.) for channels covered, assuming that a higher dimension yields a better ACR accuracy. In some embodiments, the fees to use a particular tuner bank can be dynamically determined based on the supply and demand of the tuner bank. A tuner bank may have a predefined capacity, for example 100 maximum personalized content providers or advertising campaigns per unit time (second, minute, hour, day, week, month or year) relying on any targeting method utilizing the chosen tuner bank. Namely, in some embodiments, only a certain number of personalized content providers or advertising campaigns with highest bid amounts can be associated with a certain tuner bank for audience selection purposes or targeted advertisements.

In some embodiments, additional "side" information may be obtained and/or generated to determine the channel being watched and, therefore bypassing fingerprinting and ACR processes. An example of side information may be generated by another device (e.g., a remote control, a smart phone, a voice controller, a hand gesture recognition device, etc.) that may be used to control the channel of the networked device (e.g., networked device 210, FIGS. 2-3). An initial ACR process may be used to determine the channel of the networked device. If the user does not change the channel, the same channel estimate may be used to determine subsequent TV shows. Moreover, when the other device changes the channel, this input may be used to determine the new channel. For example, if the user presses the up-channel button, entered a specific channel, etc., on a remote control, the system may infer that the channel has been incremented/set. Additionally, or alternatively, the controlling of the networked device by the other device can trigger ACR. It should be noted that while the methods and examples are described with respect to TV programming data, they may also be applied analogously to other types of content and in other contexts, such as video games and VOD (as described above).

Figure 6:
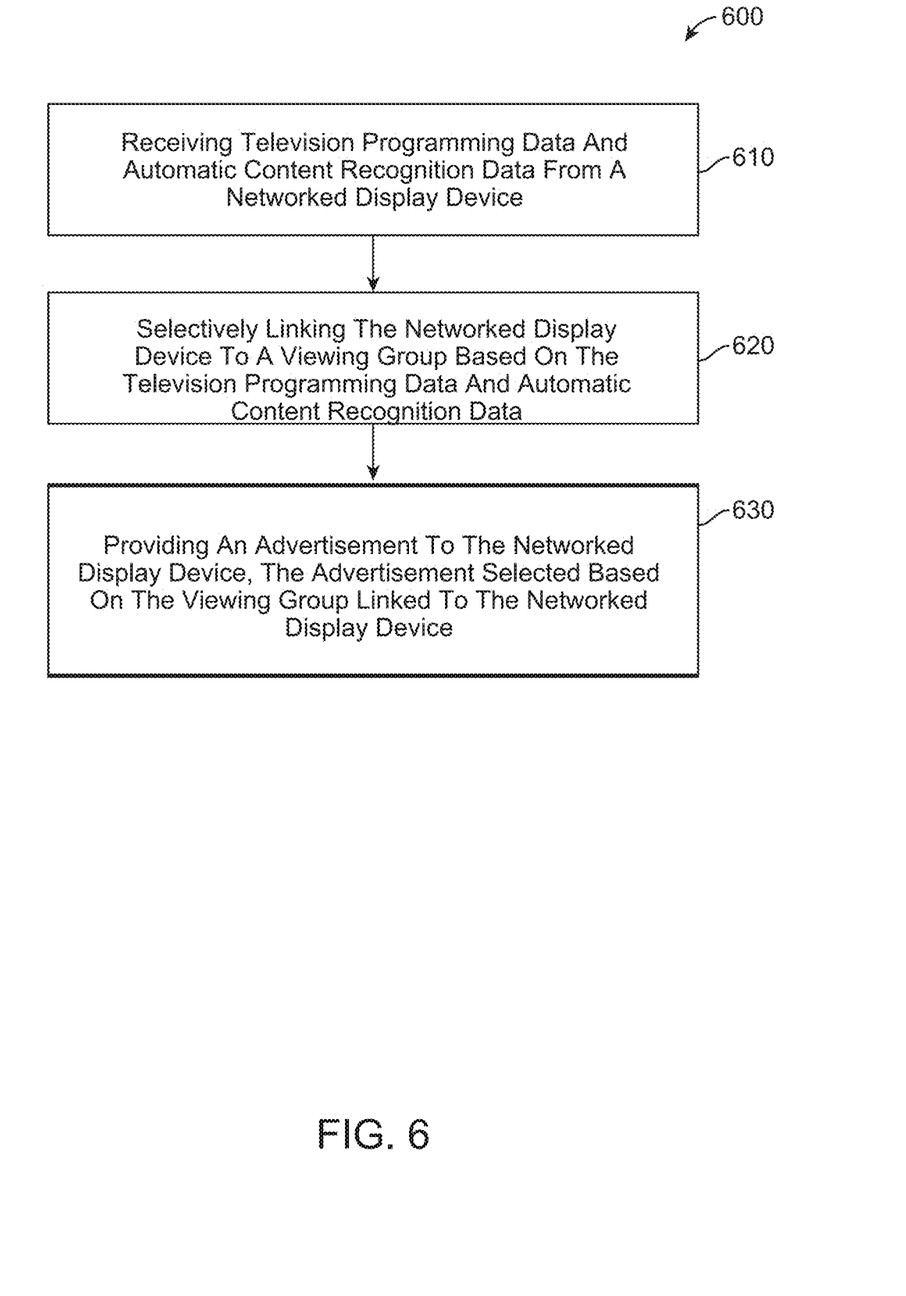
FIG. 6 shows an example flow diagram of a process for selective content provisioning, according to an embodiment.

FIG. 6 shows an example flow diagram of a process 600 for selective content provisioning, according to some embodiments. In some embodiments, in block 610 process 600 provides for receiving television programming data (e.g., from EPG metadata storage 250) and ACR data from a networked display device (e.g., networked device 200, FIGS. 2-3). In block 620 process 600 provides for selectively linking the networked display device to a viewing group (e.g., a taste bucket (group)) based on the television programming data and ACR data. In block 630, an advertisement is provided to the networked display device, where the advertisement is selected based on the viewing group linked to the networked display device.

In some embodiments, process 600 may further provide for managing viewing-group graphs (e.g., taste graphs) for respective categories of media content (e.g., as shown in the example 400, FIG. 4). In some implementations, the ACR data identifies media content played on the networked display device. Selective linking may be further based on a corresponding viewing-group taste graph generated based on the television programming data and the ACR data matching a category of the corresponding viewing-group taste graph.

In some embodiments, process 600 may further include performing ranking processing to selectively link the networked display device to the viewing group in response to determining that the networked display device is ranked higher than a threshold ranking. In some implementations, selectively linking the networked display device to the viewing group is based on determining a relative amount of time the networked display device spent watching a group of programs over a predetermined duration.

In some embodiments, the group of programs corresponds to programs linked to the viewing group based on the television programming data, and the relative amount of time being determined based on the automatic content recognition data and being relative to a total viewing time of the networked display device for all television programs.

In some embodiments, the networked display device is linkable to multiple viewing groups based on determining that the networked display device is ranked higher than a threshold ranking for each of the multiple viewing groups, and ACR is based on at least one of fingerprinting of screenshots, availability of multiple tuner banks and fingerprinting audio.

In some embodiments, process 600 may further include selecting a tuner bank from the multiple tuner banks based on at least one of: format of the screenshots, availability of an audio fingerprint, and tuner bank bidding. It should be noted that while the methods and examples are described with respect to TV programming data, they may also be applied analogously to other types of content and in other contexts, such as video games and VOD (as described above).

Figure 7:
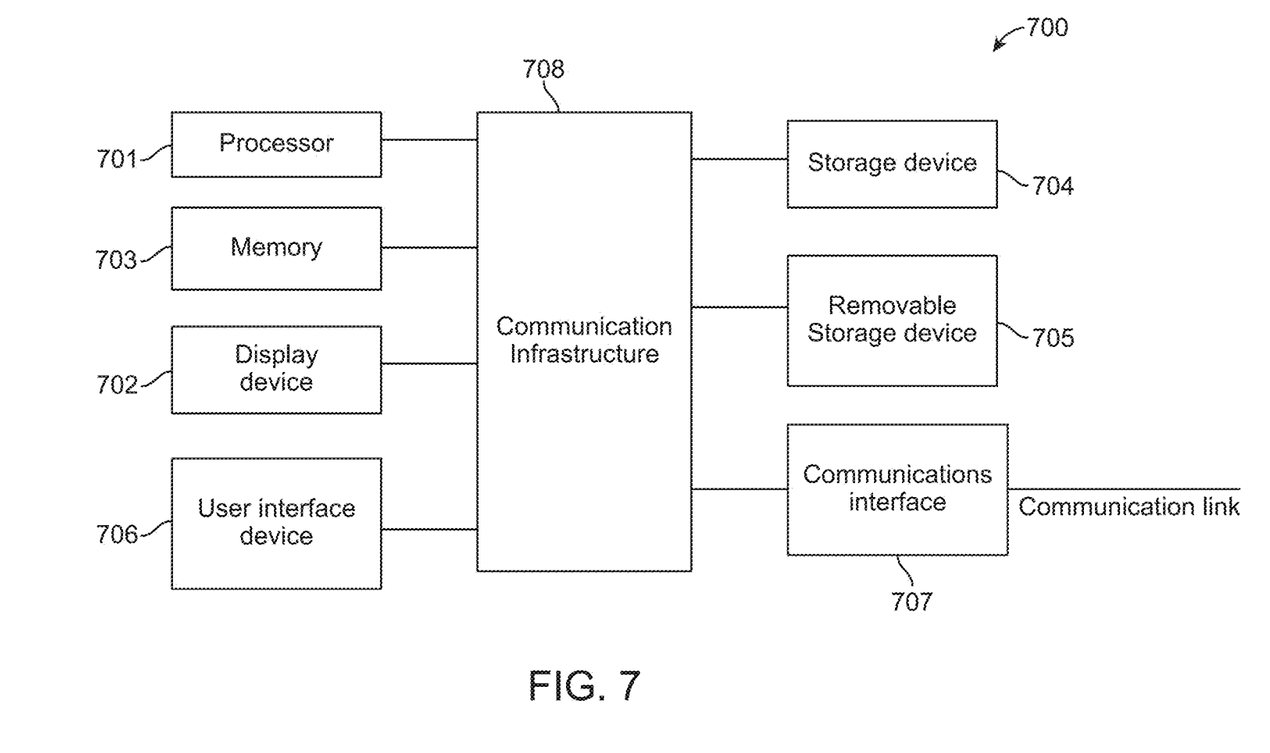
FIG. 7 is an exemplary high-level block diagram showing an information processing system comprising a computer system useful for implementing disclosed embodiments.

FIG. 7 is a high-level block diagram showing an information processing system comprising a computer system 700 useful for implementing the disclosed embodiments. Computer system 700 may be incorporated in a device 52, 56, FIG. 1, networked device 210, FIG. 2, the matching server 220, the ACR server 230, data mining 260, logging 235, advertising platform 280, or ads engine 340. The computer system 700 includes one or more processors 701 (e.g., processor(s) of the components in system 200, FIG. 2), and can further include an electronic display device 702 (for displaying video, graphics, text, and other data), a main memory 703 (e.g., random access memory (RAM)), storage device 704 (e.g., hard disk drive), removable storage device 705 (e.g., removable storage drive, removable memory module, a magnetic tape drive, optical disk drive, computer readable medium having stored therein computer software and/or data), user interface device 706 (e.g., keyboard, touch screen, keypad, pointing device), and a communication interface 707 (e.g., modem, a network interface (such as an Ethernet card), a communications port, or a PCMCIA slot and card). The communication interface 707 allows software and data to be transferred between the computer system and external devices (e.g., over communication path 54, FIG. 1). The system 700 further includes a communications infrastructure 708 (e.g., a communications bus, cross-over bar, or network) to which the aforementioned devices/modules 701 through 707 are connected.

Information transferred via communications interface 707 may be in the form of signals such as electronic, electromagnetic, optical, or other signals capable of being received by communications interface 707, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In some embodiments, processing instructions for flowcharts 300 (FIG. 3), 500 (FIG. 5) and processing instructions for process 600 (FIG. 6) may be stored as program instructions on the memory 703, storage device 704 and the removable storage device 705 for execution by the processor 701.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A server for providing selected content to multiple networked display devices, the server comprising:
 a memory configured to store instructions;
 at least one processor configured to execute the instructions to:
  receive television programming data and automatic content recognition data from a networked display device, the automatic content recognition data providing information comprising watched program and channel information viewing time information; and selectively link the networked display device to multiple viewing groups based on the television programming data and the automatic content recognition data, wherein each of the multiple viewing groups has multiple viewing group versions, and each version of the multiple viewing group versions is for a different screenshot resolution of a plurality of screenshot resolutions obtained from each of the multiple networked display devices based on displayed media content, the automatic content recognition data includes automatic content recognition log data, a viewing group profile is generated for each of the multiple networked display devices based on the automatic content recognition log data, the automatic content recognition log data is linked to the networked display device based on associating the viewing group profile with the networked display device, and the automatic content recognition log data comprises aggregated data for the multiple networked display devices; and an advertisement engine configured to provide an advertisement to the networked display device, the advertisement selected based on at least one of the multiple viewing groups linked to the networked display device.

2. The server of claim 1, wherein the at least one processor is further configured to execute instructions to:

manage viewing-group graphs for respective categories of media content;

wherein at least one network display device identifier is matched with identification information in automatic recognition data logs, the viewing group profile comprises information for multiple associated viewing groups, and the advertisement is selected using the viewing group profile of the networked display device.

3. The server of claim 1, wherein:

the automatic content recognition data identifies media content played on the networked display device;

the networked display device is selectively linked based on each corresponding viewing-group taste graph generated based on the television programming data and the automatic content recognition data matching a category of the corresponding viewing-group taste graph;

the corresponding viewing-group taste graph captures static and consistent behavior patterns formed over a plurality of weeks;

the multiple viewing group versions are generated in parallel; and each version of the multiple viewing group versions is generated for each of the plurality of screenshot resolutions, and each version of the multiple viewing group versions is used for identifying the automatic content recognition data.

4. The server of claim 1, wherein:

the at least one processor is further configured to perform ranking processing to selectively link the networked display device to the multiple viewing groups in response to a determination that the networked display device is ranked higher than a threshold ranking;

the aggregated data for the multiple networked display devices comprises match data and device metadata; and each networked display device has a network display device identifier that is associated with the viewing group profile.

5. The server of claim 1, wherein the at least one processor selectively links the networked display device to the multiple viewing groups based on determining a relative amount of time the networked display device spent watching a group of programs over a predetermined duration, the viewing group profile is associated with the multiple networked display devices based on network display device identifiers, and the viewing group profile indicates which of the multiple viewing groups a particular network display device identifier belongs to.

6. The server of claim 5, wherein the group of programs corresponds to programs linked to the multiple viewing groups based on the television programming data, and the relative amount of time being determined based on the automatic content recognition data and being relative to a total viewing time of the networked display device for all television programs.

7. The server of claim 1, wherein the networked display device is linkable to the multiple viewing groups based on the at least one processor determining that the networked display device is ranked higher than a threshold ranking for each of the multiple viewing groups, and automatic content recognition is based on at least one of fingerprinting of screenshots, availability of multiple tuner banks and fingerprinting audio.

8. The server of claim 7, wherein the at least one processor performs tuner bank selection from the multiple tuner banks based on at least one of: format of the screenshots, availability of an audio fingerprint, and tuner bank bidding.

9. A method for providing selected content to multiple networked display devices, the method comprising:

receiving television programming data and automatic content recognition data from a networked display device, the automatic content recognition data providing information comprising watched program and channel information and viewing time information;

selectively linking the networked display device to multiple viewing groups based on the television programming data and the automatic content recognition data, wherein each of the multiple viewing groups has multiple viewing group versions, and each version of the multiple viewing group versions is for a different screenshot resolution of a plurality of screenshot resolutions obtained from each of the multiple networked display devices based on displayed media content, the automatic content recognition data includes automatic content recognition log data, a viewing group profile is generated for each of the multiple networked display devices based on the automatic content recognition log data, the automatic content recognition log data is linked to the networked display device based on associating the viewing group profile with the networked display device, and the automatic content recognition log data comprises aggregated data for the multiple networked display devices; and providing an advertisement to the networked display device, the advertisement selected based on at least one of the multiple viewing groups linked to the networked display device.

10. The method of claim 9, further comprising:

managing viewing-group graphs for respective categories of media content;

wherein at least one network display device identifier is matched with identification information in automatic recognition data logs, the viewing group profile comprises information for multiple associated viewing groups, and the advertisement is selected using the viewing group profile of the networked display device.

11. The method of claim 9, wherein:
the automatic content recognition data identifies media content played on the networked display device;
the selectively linking is further based on each corresponding viewing-group taste graph generated based on the television programming data and the automatic content recognition data matching categories of the corresponding viewing-group taste graphs;
the corresponding viewing-group taste graphs capture static and consistent behavior patterns formed over a plurality of weeks;
the multiple viewing group versions are generated in parallel; and
each version of the multiple viewing group versions is generated for each of the plurality of screenshot resolutions, and each version of the multiple viewing group versions is used for identifying the automatic content recognition data.

12. The method of claim 9, further comprising:
performing ranking processing to selectively link the networked display device to the multiple viewing groups in response to determining that the networked display device is ranked higher than a threshold ranking;
wherein the aggregated data for the multiple networked display devices comprises match data and device metadata, and each of the multiple networked display devices has a network display device identifier that is associated with the viewing group profile.

13. The method of claim 9, wherein selectively linking the networked display device to the multiple viewing groups is based on determining a relative amount of time the networked display device spent watching a group of programs over a predetermined duration, the viewing group profile is associated with the multiple networked display devices based on network display device identifiers, and the viewing group profile indicates which of the multiple viewing groups a particular network display device identifier belongs to.

14. The method of claim 13, wherein the group of programs corresponds to programs linked to the multiple viewing groups based on the television programming data, and the relative amount of time being determined based on the automatic content recognition data and being relative to a total viewing time of the networked display device for all television programs.

15. The method of claim 9, wherein the networked display device is linkable to the multiple viewing groups based on determining that the networked display device is ranked higher than a threshold ranking for each of the multiple viewing groups, and automatic content recognition is based on at least one of fingerprinting of screenshots, availability of multiple tuner banks and fingerprinting audio.

16. The method of claim 15, further comprising selecting a tuner bank from the multiple tuner banks based on at least one of: format of the screenshots, availability of an audio fingerprint, and tuner bank bidding.

17. A non-transitory processor-readable medium that includes a program that when executed by a processor performs a method comprising:
receiving, by a processor, television programming data and automatic content recognition data from a networked display device, the automatic content recognition data providing information comprising watched program and channel information and viewing time information;
selectively linking the networked display device to multiple viewing groups based on the television programming data and the automatic content recognition data, wherein each of the multiple viewing groups has multiple viewing group versions, and each version of the multiple viewing group versions is for a different screenshot resolution of a plurality of screenshot resolutions obtained from each of multiple networked display devices based on displayed media content, the automatic content recognition data includes automatic content recognition log data, a viewing group profile is generated for each of the multiple networked display devices based on the automatic content recognition log data, the automatic content recognition log data is linked to the networked display device based on associating the viewing group profile with the networked display device, and the automatic content recognition log data comprises aggregated data for the multiple networked display devices; and
providing an advertisement to the networked display device, the advertisement selected based on at least one of the multiple viewing groups linked to the networked display device.

18. The non-transitory processor-readable medium of claim 17, wherein the method further comprising:
managing viewing-group graphs for respective categories of media content; and
performing ranking processing to selectively link the networked display device to the multiple viewing groups in response to determining that the networked display device is ranked higher than a threshold ranking;
wherein:
the viewing group profile comprises information for multiple associated viewing groups;
the advertisement is selected using the viewing group profile of the networked display device;
the automatic content recognition data identifies media content played on the networked display device;
the selectively linking is further based on corresponding viewing-group taste graphs generated based on the television programming data and the automatic content recognition data matching a category of the corresponding viewing-group taste graph;
the corresponding viewing-group taste graphs capture static and consistent behavior patterns formed over a plurality of weeks;
at least one network display device identifier is matched with identification information in automatic recognition data logs;
the multiple viewing group versions are generated in parallel; and
each version of the multiple viewing group versions is generated for each of the plurality of screenshot resolutions, and each version of the multiple viewing group versions is used for identifying the automatic content recognition data.

19. The non-transitory processor-readable medium of claim 17, wherein selectively linking the networked display device to the multiple viewing groups is based on determining a relative amount of time the networked display device spent watching a group of programs over a predetermined duration, the group of programs corresponds to programs linked to the multiple viewing groups based on the television programming data, the relative amount of time being determined based on the automatic content recognition data and being relative to a total viewing time of the networked display device for all television programs, the aggregated data for the multiple networked display devices comprises match data and device metadata, and each networked display device has a network display device identifier that is associated with the viewing group profile.

20. The non-transitory processor-readable medium of claim 17, wherein the networked display device is linkable to the multiple viewing groups based on determining that the networked display device is ranked higher than a threshold ranking for each of the multiple viewing groups, automatic content recognition is based on at least one of fingerprinting of screenshots, availability of multiple tuner banks and fingerprinting audio, the viewing group profile is associated with the multiple networked display devices based on network display device identifiers, and the viewing group profile indicates which of the multiple viewing groups a particular network display device identifier belongs to; and     the method further comprising selecting a tuner bank from the multiple tuner banks based on at least one of: format of the screenshots, availability of an audio fingerprint, and tuner bank bidding.

\* \* \* \* \*